US010526750B2

United States Patent
Bhaskaran (10) Patent No.: US 10,526,750 B2
(45) Date of Patent: Jan. 7, 2020

(54) PROCESSING PRINT MEDIA INCLUDING MARKED PORTIONS AND UNMARKED PORTIONS

(71) Applicant: Hewlett-Packard Development Company, L.P., Houston, TX (US)

(72) Inventor: Shinoj Bhaskaran, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/079,650

(22) PCT Filed: Jun. 30, 2016

(86) PCT No.: PCT/IN2016/050212
§ 371 (c)(1),
(2) Date: Aug. 24, 2018

(87) PCT Pub. No.: WO2018/002943
PCT Pub. Date: Jan. 4, 2018

(65) Prior Publication Data
US 2019/0055693 A1    Feb. 21, 2019

(51) Int. Cl.
*D21B 1/10* (2006.01)
*H04N 1/407* (2006.01)
*H04N 1/58* (2006.01)
*D21B 1/06* (2006.01)
*B26D 5/00* (2006.01)

(52) U.S. Cl.
CPC ............... *D21B 1/10* (2013.01); *D21B 1/061* (2013.01); *H04N 1/407* (2013.01); *H04N 1/58* (2013.01); *B26D 5/007* (2013.01)

(58) Field of Classification Search
None
See application file for complete search history.

(56) References Cited

U.S. PATENT DOCUMENTS

| 8,185,996 B2 | 5/2012 | Shrader |
| 8,693,064 B2 | 4/2014 | Brewington |
| 2012/0268799 A1* | 10/2012 | Brewington ............. B41J 29/26 358/448 |

FOREIGN PATENT DOCUMENTS

| EP | 1020772 A1 | 7/2000 |
| JP | 2005-208171 A | 8/2005 |

(Continued)

OTHER PUBLICATIONS

Zhenyng, S., et al., "Combined De-inking Technology Applied on Laser Printed Paper", Feb. 2009, http://www.sciencedirect.com/, 2 pages.

*Primary Examiner* — Andrew H Lam
(74) *Attorney, Agent, or Firm* — HP Inc. Patent Department (57) ABSTRACT

Examples to process print media (105) are defined herein. At least one marked cell from a plurality of cells (305) extending throughout a processed image of the print media (105) is detected. The processed image of the print media (105) may include marked portions (110) and unmarked portions (115). Further, the marked cell overlays a marked portion of the processed image. Once the marked cell is detected, the marked portions (110) of the print media (105) corresponding to the marked portions (110) of the processed image may be determined and separated from the print media (105) to provide a processed media (130) comprising the unmarked portions (115).

15 Claims, 7 Drawing Sheets

(56) References Cited

FOREIGN PATENT DOCUMENTS

| JP | 2006168878 A | 6/2006 |
|----|--------------|--------|
| JP | 2008124688 A | 5/2008 |
| WO | WO-2010083535 A2 | 7/2010 |
| WO | WO-2015/173575 A1 | 11/2015 |

\* cited by examiner

PROCESSING PRINT MEDIA INCLUDING MARKED PORTIONS AND UNMARKED PORTIONS

BACKGROUND

With the widespread use of printers, various print media, such as paper, may be used for printing content for commercial, institutional and private use. This may generate large volumes of print media which in turn may have to be processed for recycling. As would be understood, recycling provides an environmentally conscious mechanism for reusing such printed media.

BRIEF DESCRIPTION OF FIGURES

The following detailed description references the drawings, wherein.

DETAILED DESCRIPTION

Owing to extensive use of printers, large volumes of print media are generated. The print media may include any media, such as papers, paperboards, flyers, cards, and leaflets having printed content. To meet the increasing demand of media for printing, and to address environmental and cost related concerns, such print media may be recycled.

Recycling may generally involve a de-inking process to remove ink from the print media to provide fresh media for reuse. The type of de-inking process to be used is generally based on a type of ink on the printed media. However, at times it may be challenging to determine the ink type in order to further determine the de-inking process which may be utilized for removing ink from the printed media. Not using the appropriate de-inking process may in turn negatively affect the de-inking and recycling process. Moreover, as certain ink types may not be effectively removed and recycled, a failure to detect such inks during the de-inking process may result in deterioration of the quality of recycled media thus produced.

Further, there has been a growing concern regarding the use of harmful chemicals during the de-inking processes, due to which the use of de-inking process for recycling has been generally discouraged. Owing to limitations and complexities associated with the de-inking process, recycling of the print media generally face quality issues, cost, and environment related challenges.

Approaches for processing print media for recycling are described. The print media may comprise marked portions and unmarked portions. An unmarked portion corresponds to a portion of the print media having no content and thus being 'clean'; while the marked portion may be considered as a portion on the printed media having some content, for instance, by way of content printed thereupon, handwritten content, or other stray marks that may have been caused while handling the print media.

In an example, to process the print media, a digital image, such as a scanned image, of the print media is obtained. The digital image may be further processed to divide the digital image into multiple cells extending throughout the digital image. The digital image being divided into the cells may be referred to as processed image. The multiple cells may be arranged in a grid-like pattern. As a result, one or more cells may overlay marked portion(s) of the digital image, and remaining others may overlay unmarked portions. The cells overlaying the marked portions may be detected and tagged as marked cells within the processed image.

On identifying the marked cells, areas corresponding to marked cells on the actual printed media may then be identified. Once the corresponding portions of the print media are identified, the marked portions present on the print media corresponding to marked cells of the processed image, are separated from the print media. As would be understood, once the marked portions are separated, the resulting print media would include the remaining unmarked portions, i.e., portions which may be free from any printed content, handwritten content, or other stray marks. Since the remaining portions of the print media are free from any markings, it may be further recycled without relying on any de-inking process. In one example, the marked portions corresponding to the marked cells are removed by a media separating unit. The media separating unit may implement a separating tool, for instance, a mechanical cutting source or a laser cutting source, to separate the marked portions. The media separating unit may accordingly analyze each cell of the digital image and activate the separating tool, when a marked cell is detected in the digital image to remove the corresponding marked portion from the print media.

Thus, the present subject matter provides for efficient and environment friendly recycling of the print media by bypassing the de-inking process. Further, the present technique may be integrated with existing systems, such as printing systems, thereby making it cost intensive. Additionally, as subsequent recycling of the print media may be performed without de-inking, the recycling may be simpler, which in turn may provide for reduction in infrastructure and de-inking related costs. Moreover, the quality of the processed media provided for recycling may also be maintained.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
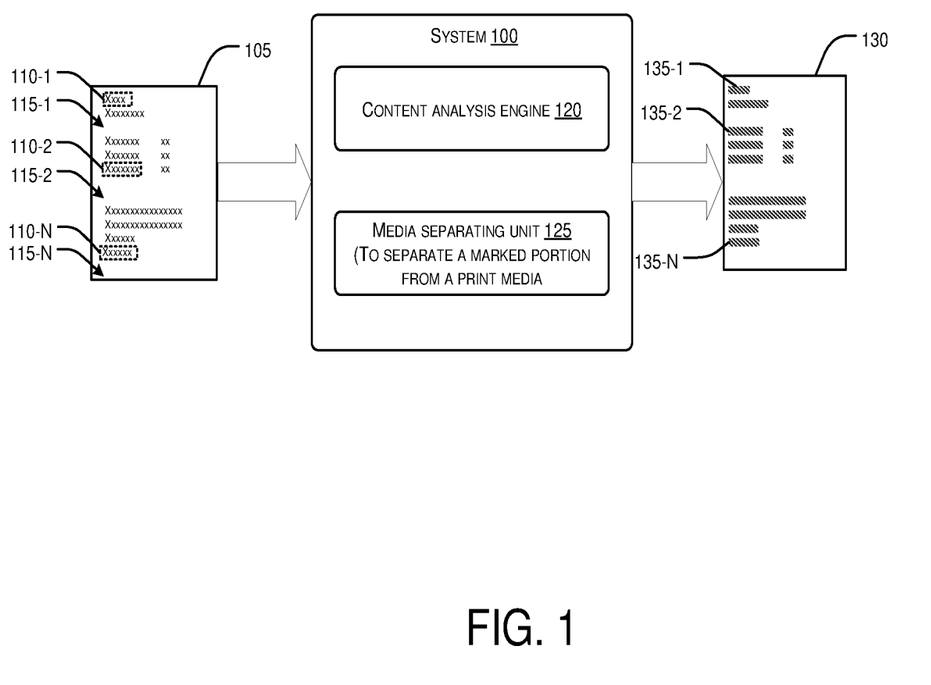
FIG. 1 illustrates a block diagram of a system for processing print media, according to an example implementation of the present subject matter.

FIG. 1 illustrates a block diagram of a system 100 to process print media, according to an example implementation of the present subject matter. In an example, a print media 105 to be processed may include one or more marked portions 110-1, 110-2, . . . 110-N and one or more unmarked portions 115-1, 115-2, . . . 115-N. The marked portions 110-1, 110-2, . . . 110-N, collectively referred to as marked portion(s) 110, may include content, such as printed content, handwritten content, or other stray marks. For example, the print media 105 may be a printed paper having textual content printed thereon. In said example, each word, a page number, and a bullet point may form a marked portion 110, while spacing between two words, line spacing, and blank spaces at the margins may be considered as the unmarked portions 115. Likewise, various other print media 105 may have such marked and unmarked portions, based on content provided thereon.

To process the print media 105, the system 100 may include, amongst other things, a content analysis engine 120 and a media separating unit 125. In an example, the content analysis engine 120 may obtain a processed image corresponding to a digital image of the print media 105. The processed image includes multiple cells, where one or more cells may overlay the marked portions 110 and remaining cells may overlay the unmarked portions 115. The content analysis engine 120 may analyze each of the cells to detect one or more cells overlaying the marked portions 110.

The media separating unit 125 to process the print media 105 may determine areas of the print media 105 corresponding to the marked portions of the processed image, based on the detected cells. Further, the determined areas, i.e., the marked portions 110 may be separated from the print media 105 to provide processed media 130 including the unmarked portions 115. The portions corresponding to the marked portions 110, which are removed are illustrated as separated portions 135-1, 135-2, . . . and 135-N. Thus, the processed media 130 is free from ink and may be easily recycled.

Figure 2:
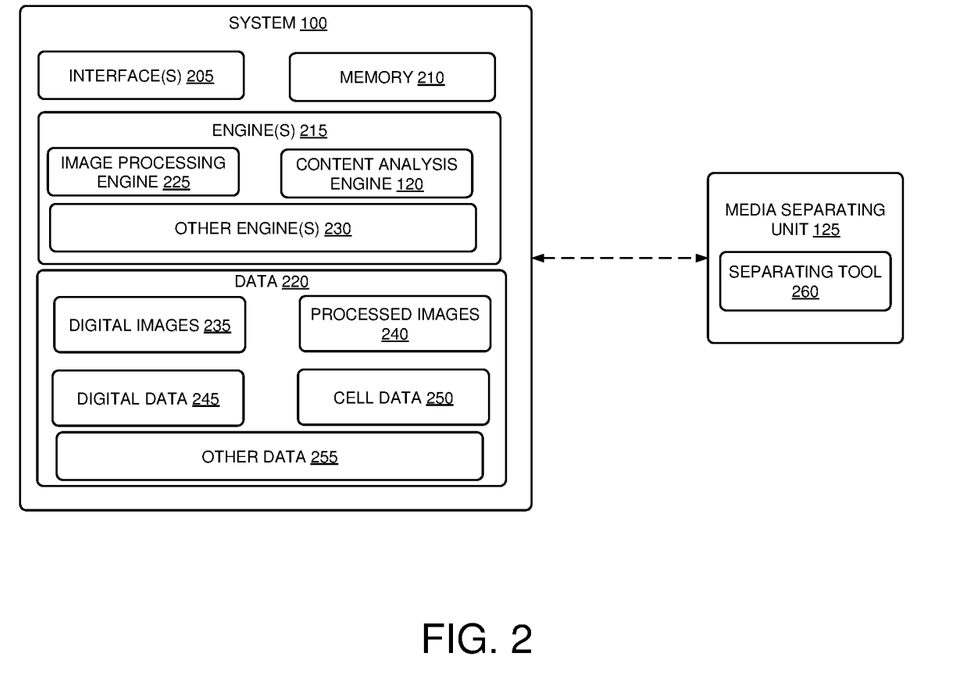
FIG. 2 illustrates another block diagram of the system for processing the print media, according to an example implementation of the present subject matter.
Figure 3:
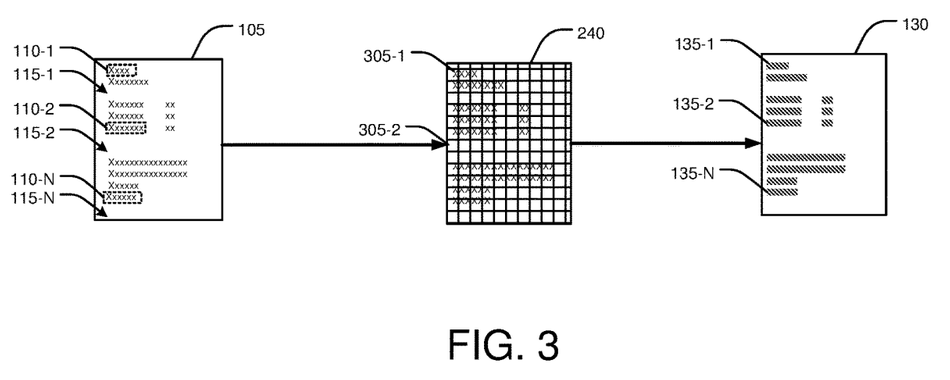
FIG. 3 schematically illustrates processing of the print media, according to an example implementation of the present subject matter.

The above aspects and further details are provided in conjunction with FIGS. 2 and 3. FIG. 2 illustrates a block diagram of the system 100, according to another example implementation of the present subject matter. FIG. 3 depicts various stages involved in processing print media 105, as per an example. In FIG. 2, the system 100 may be implemented as a standalone computing system communicatively connected through a network to other devices. In other examples, the system 100 may be integrated with other systems, such as a printer, a copier, a facsimile machine, a special purpose computer with printing capabilities, a server with an associated printing unit, and/or any other type of computing device. The system 100 may be further coupled or in communication with the media separating unit 125. Although the media separating unit 125 is depicted as being as being separate from the system 100, the media separating unit 125 may also be integrated within the system 100 without deviating from the scope of the present subject matter.

In the present example, the system 100 includes interface(s) 205, memory 210, engine(s) 215, and data 220. The interface(s) 205 may include a variety of interfaces, for example, interfaces for data input and output devices, referred to as I/O devices, storage devices, network devices, and the like. The interface(s) 205 facilitate communication between the system 100 and various computing devices connected in a networked environment, or also with the media separating unit 125.

The memory 210 may store one or more computer-readable instructions, which may be fetched and executed so as to implement functionalities of the engine(s) 215. The memory 210 may be any non-transitory computer-readable medium including, for example, volatile memory such as RAM, or non-volatile memory such as EPROM, flash memory, and the like.

The system 100 may further include engine(s) 215 and data 220. The engine(s) 215 may be implemented as a combination of hardware and programming (for example, programmable instructions) to implement one or more functionalities of the engine(s) 215. In examples described herein, such combinations of hardware and programming may be implemented in a number of different ways. For example, the programming for the engine(s) 215 may be processor executable instructions stored on a non-transitory machine-readable storage medium and the hardware for the engine(s) 215 may include a processing resource (for example, one or more processors), to execute such instructions. In the present examples, the machine-readable storage medium may store instructions that, when executed by the processing resource, implement engine(s) 215. In such examples, the system 100 may include the machine-readable storage medium storing the instructions and the processing resource to execute the instructions, or the machine-readable storage medium may be separate but accessible to system 100 and the processing resource. In other examples, engine(s) 215 may be implemented by electronic circuitry.

In an example, the engine(s) 215 include an image processing engine 225, content analysis engine 120, and other engine(s) 230. The other engine(s) 230 may implement functionalities that supplement applications or functions performed by the system 100. The data 220 includes data that is either predefined or generated as a result of the functionalities implemented by any of the engine(s) 215. In one example, the data 220 may include digital image(s) 235, processed images 240, digital data 245, cell data 250, and other data 255.

In operation, the system 100 may initially receive a print media, such as print media 105. As mentioned previously, the print media 105 may include any media which has been utilized by one or more individuals. As would be understood, the print media 105 may have been used for printing content. The print media 105 may also have been used for entering manual annotations or illustrations from various individuals by way of markings. As a result of the print media 105, the print media 105 may have portions which are marked (i.e., portions 110) and portions which are free from markings or any printed content (i.e., unmarked portions 115).

Returning to the functioning of system 100, a digital image corresponding to the print media 105 is obtained. In one example, the digital image may be stored within the system 100 as digital image(s) 235. The digital image(s) 235 may be considered as a digital representation of the print media 105. As explained previously, the print media 105 may include one or more marked portions 110 and unmarked portion 115. The marked portions 110 are portions which may carry printed content or any other markings inscribed manually during the course of using such print media 105.

The digital image(s) 235 for the print media 105 to be processed may in turn be captured by an image capturing unit (not shown in FIG. 2). The image capturing unit may be in communication with the system 100 or may be implemented as a component within the system. Examples of an image capturing unit include, but are not limited to, a camera or a scanning unit. The system 100 may activate the image capturing unit for capturing digital image(s) 235 corresponding to the print media 105. The digital image(s) 235 are such that they capture such marked portions 110 of the print media 105. Besides the digital representation of the print media 105, the digital image(s) 235 may also include information pertaining to one or more attributes of the print media 105. For example, the digital image(s) 235 may include information pertaining to the size of the print media 105, the type of print media 105, and the like.

Once obtained, the image processing engine 225 may process the digital image(s) 235. For processing, the image processing engine 225 may process one or more of the digital image(s) 235, to provide a processed image (stored as processed image 240). Further, the image processing engine 225 may overlay a series of cells to overlap the entire digital image(s) 235 to provide a processed image 240. The processed image 240 thus obtained may be considered as a digital image divided into multiple cells 305-1, 305-2, ... 305-N. The multiple cells 305-1, 305-2, ... 305-N, collectively referred to as cell(s) 305, may be, for instance, in form of an m×n array or in a grid-like pattern. Each of the cells may be defined by its position in the grid, such as (0,0), (0, 1) ... (0,n), (1,n) ... (m, n). In few examples, the digital mage may be divided into the cells 305, based on a default logic defining the dimensions. For instance, the default logic may define that division into the cells 305 should be such that each cell includes a specific number of pixels.

In an example, the digital image may be divided into the cells 305, based on a dimension or a granularity of a separating tool 260 of the media separating unit 125. The separating tool 260 is a component of the media separating unit 125 capable of separating a portion of the print media 105. For instance, the separating tool 260 may be the component that punches or separates out the portions from the print media 105. Accordingly, dimensions of each of the cells 305 may be based on the dimensions of the separating tool 260.

Upon dividing the digital image into the cells 305, the content analysis engine 120 may analyze the processed image 240 to detect the cells 305 overlaying the marked portions 110 and the unmarked portions 115. In an example, the content analysis engine 120 may generate digital data 245 corresponding to the digital image. The digital data 245 may be in the form of a series of raster data including information pertaining to location of each such pixel, where ink is to be dropped if the digital image was to be printed. Thus, using the digital data 245 (i.e., raster data), the pixels that would include content may be detected. For instance, the content analysis engine 120, for each pixel, determines ink is to be dropped in a portion of a media corresponding to the pixel. If the ink is to be dropped, the pixel is determined to include content, otherwise not. It should be noted that the pixel based detection of marked cells is provided as one example. Other examples for detecting marked cells may be also be implemented without deviating from the scope of the present subject matter.

Further, the location of each of the detected pixels may then be mapped to the cells 305. The cells 305 may be identified by their position in the grid or the array. As result, the cells 305 that map to detected pixels may be determined to include content, i.e., the marked portion 110. In cases where a cell 305 includes multiple pixels, a cell 305 is detected as a marked cell when at least one of the pixels is determined to include content. It may also be the case, that such marked portions 110 may extend across multiple adjoining cells, thus rendering them as marked cells. Thus, the marked cell represents a virtual area of the digital image that overlays a marked portion, i.e., includes content. Likewise, an unmarked cell represents a virtual area of the digital image that is clean.

Accordingly, based on the digital data 245, the content analysis engine 120 for each cell 305 may ascertain whether it overlays the marked portion 110. The cells 305 that overlay the marked portion 110 may be tagged as marked cells in the digital image, while other cells 305 may be tagged as the unmarked cells. For instance, the cell 305-1 is a marked cell and the cell 305-N is an unmarked cell. The information pertaining to the marked cells and the unmarked cells may be stored in the cell data 250.

Using the information pertaining to the marked cells, the media separating unit 125 may determine the locations of the marked portions 110 of the print media 105 to be separated. In an example, the media separating unit 125 may also use the associated attributes, such as page size, in the digital image(s) 235 to appropriately determine the location of the marked portions 110 in the print media 105. For instance, the media separating unit 125 may verify that the print media 105 provided as input and the attributes in the corresponding the digital image match. In case the details, such as page size, do not match, a notification may be provided to check the settings. In other examples, such a verification may not be performed, and the print media 105 may be directly processed.

To process the print media 105, the media separating unit 125 determines areas of the print media 105 corresponding to the marked cells. In an example, the separating tool 260, for each cell 305, determines if it is a marked cell. When the cell is marked cell, the separating tool 260 separates the area of the print media 105 corresponding to the cell. However, when the cell 305 is an unmarked cell, the separating tool 260 may perform no action and proceed to next cell. Consequently, the marked portions 110 are removed from the print media 105 while the unmarked portions 115 stay to provide the processed media 130. Thus, the media separating unit 125 analyzes each of the cells in the processed image 305 to identify and separate selected portions of the print media 105.

The media separating unit 125 may be, for instance, a mechanical cutting machine, such as a punching machine. In said example, the separating tool 260 may be stylus with a punching unit at one end. The stylus may move over the print media 105 cell by cell, and determine if a current cell is a marked cell. If the current cell is the marked cell, the portion of the print media 105 corresponding to the cell is separated from the print media 105. This way the stylus may move over the entire print media 105 to cut out the marked portions 110. In other examples, the media separating unit 125 may implement other sources, such as a laser source to cut out the marked portions 110.

As a result of separation of the marked portions 110, clean print media, i.e., the processed media 130 having the unmarked portion 115 is obtained without having to de-ink the print media 105. The subsequent recycling of the processed media 130 may be simple as complicated and cost intensive de-inking processes can now be avoided.

Figure 4:
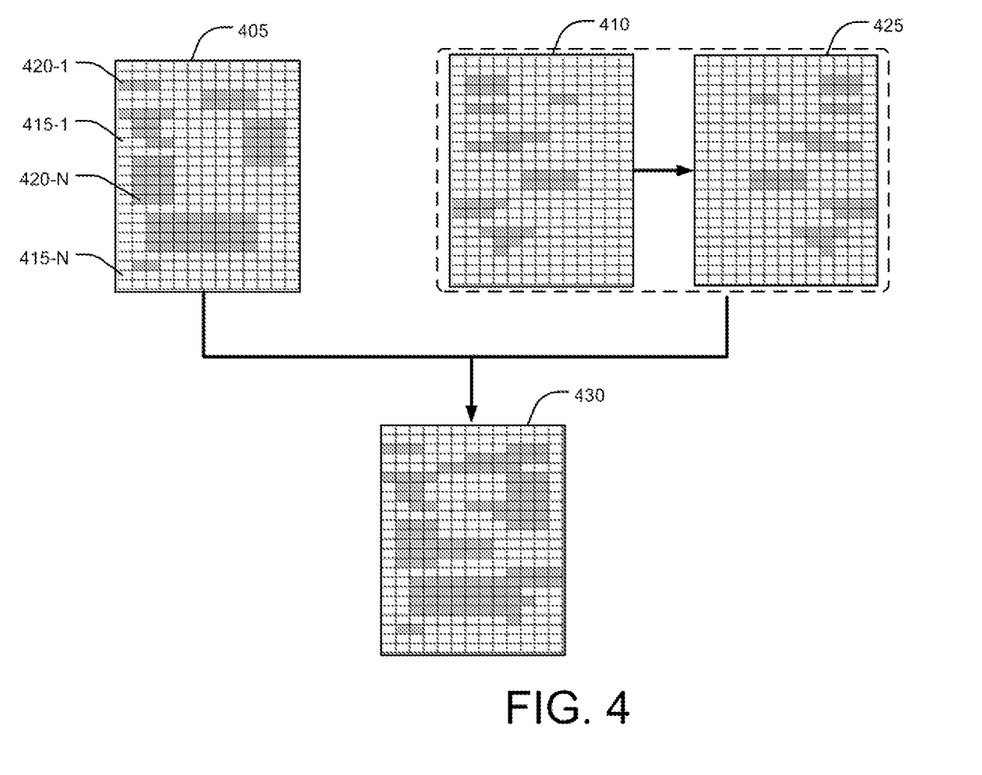
FIG. 4 schematically illustrates processing of two surfaces of the print media, according to an example implementation of the present subject matter

FIG. 4 schematically illustrates processing of two either surfaces of the print media 105, according to an example implementation of the present subject matter. Often times, both the surfaces of the print media 105 may include content and, therefore the distribution of content on both the surfaces may have to be taken in account, while processing the print media 105. For instance, answer sheets, pages of books, official documents, and the like may have content on both the surfaces.

To process the print media 105 having content on both its surfaces, the digital image of both the surfaces may be analyzed to detect the marked cells. The image processing engine 225 may receive a first digital image corresponding to a first surface of the print media 105 and a second digital image corresponding to a second surface of the print media 105. As described earlier, the image processing engine 225 may partition each of the first digital image and the second digital image into the multiple cells 305 to provide a first processed image 405 and a second processed image 410, respectively. The blank cells in each of the first processed image 405 and the second processed image 410 represent unmarked cells 415-1, . . . 415-N, and solid cells represent marked cells 420-1 . . . 420-N.

Further, the content analysis engine 120 may generate a mirror image 425 of the second processed image 410, and the mirror image 425 may be combined or overlaid on the first processed image 405 to generate a combined processed image 430. Thus, as one or more marked portions of the first processed image 405 may overlap with the marked portion(s) of the mirror image 425, they may be represented by common marked cells. This way the marked portions 110 on both the surfaces of the print media 105 may be merged in a single image to detect the marked cells.

Accordingly, the cells 305 corresponding to the marked portions of the either surface of the print media 105 may be detected. Further, the media separating unit 125 may determine the marked portions 110 of the print media, based on the detected marked cells 420. The determined portions are separated to provide the processed media 130 free from the marked portions 110.

Figure 5:
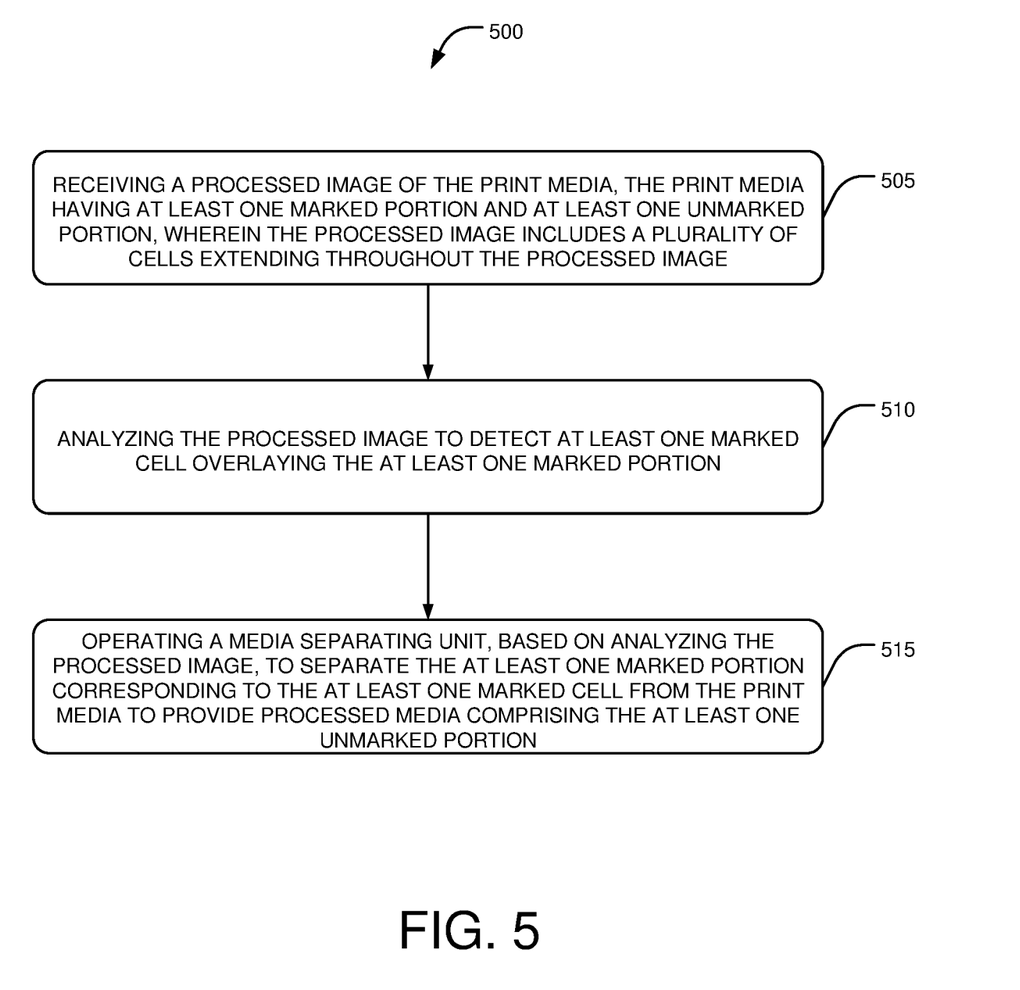
FIG. 5 illustrates a method to process the print media, according to an example implementation of the present subject matter.
Figure 6:
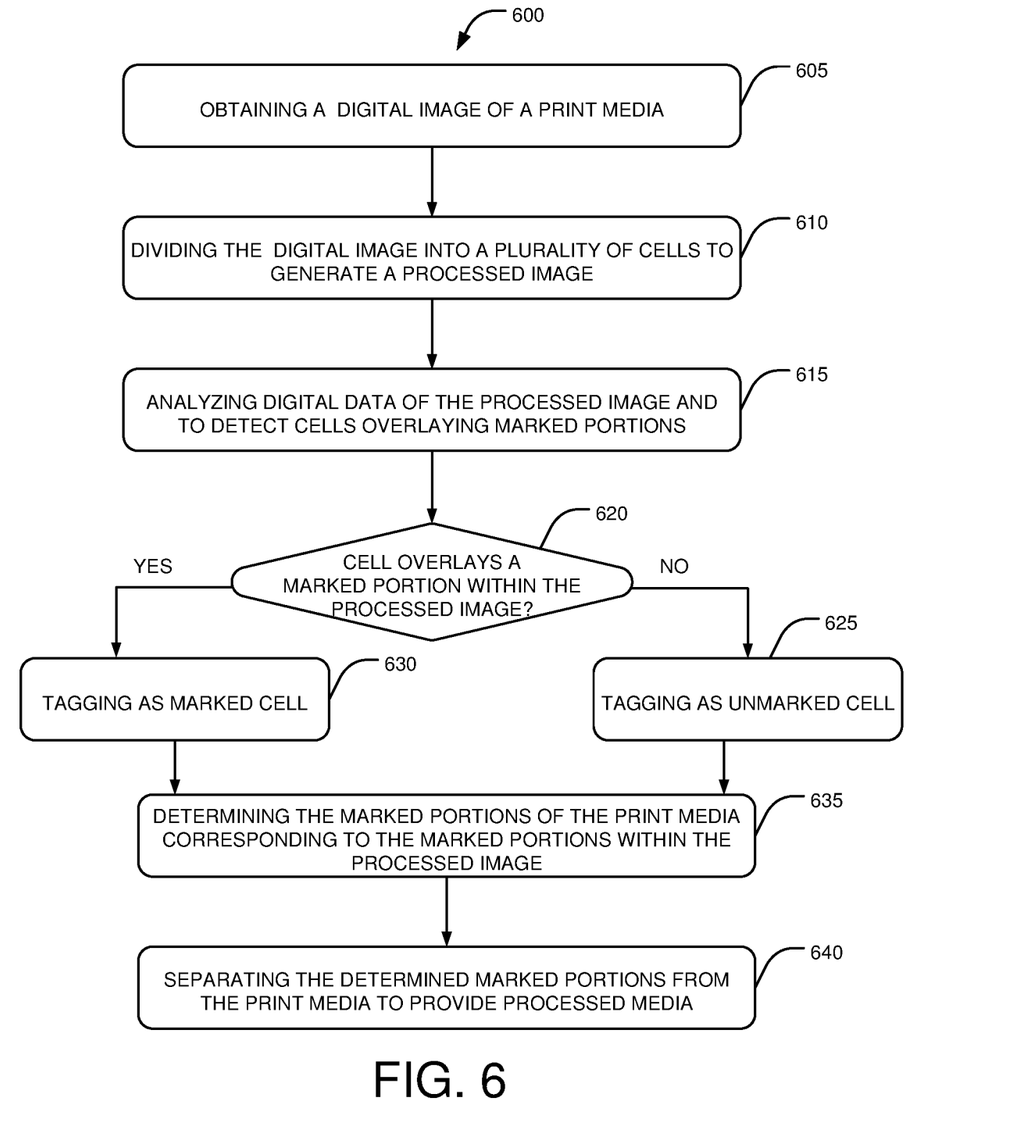
FIG. 6 illustrates a method to process the print media, according to another example implementation of the present subject matter.

Methods 500 and 600 are described in FIG. 5 and FIG. 6, respectively, for processing print media for recycling, according to an example implementation of the present subject matter. The order in which the methods 500 and 600 are described is not intended to be construed as a limitation, and any number of the described method blocks can be combined in any appropriate order to execute the methods 500 and 600 or an alternative method. Additionally, individual blocks may be deleted from the method 600 without departing from the spirit and scope of the subject matter described herein.

The methods 500 and 600 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

The methods 500 and 600 may be performed by a computer based system, such as the system 100. For the sake of brevity of description of FIG. 5 and FIG. 6, the components of the system 100 performing the various steps of the methods 500 and 600 are not described in detail with reference to FIG. 5 and FIG. 6. Such details are provided in the description provided with reference to FIG. 1-4.

Referring to FIG. 5, at block 505, a digital image of the print media is received. The print media thus received includes at least one marked portion and at least one unmarked portion. Furthermore, the digital image may be processed to include a plurality of cells extending throughout the digital image. In one example, the system 100 may receive a digital image(s) 235 of the print media 105. The print media includes at least one marked portion 110 and at least one unmarked portion 115. In an example, the digital image(s) 235 may be further processed by the processing engine 225 to divide the digital image(s) 235 into multiple cells, such as the cells 305 extending throughout the digital image.

At block 510, the digital image may be analyzed to detect at least one marked cell overlaying the at least one marked portion within the digital image. In an example, the content analysis engine 120 may analyze digital data 245 corresponding to the digital image to detect the marked cell(s). The digital data 245 may include a series of raster data. Using the raster data, the content analysis engine 120 may determine pixels corresponding to those areas of the print media 105 (i.e., marked portions 110) where ink would be dropped, if the digital image is printed. The determined pixels may be mapped to the cells 305 of the processed image 240. Based on the mapping, the cells 305 that comprise at least one of the determined pixels may be detected as marked cells.

At block 515, based on the analysis, a media separating unit may be operated to separate the marked portion corresponding to the detected marked cell. The removal of the marked portion from the print media provides a processed media. As the marked portions are removed from the print media while processing, the processed media includes the unmarked portions. In an example, the media separating unit 125 may determine the marked portions 110 of the print media 105 corresponding to the marked cells, i.e., the cells overlaying the marked portions of the processed image. Further, the determined portions are removed from the print media 105 to provide the processed media 130.

Referring to FIG. 6, the method 600 describes the method 600 for processing the print media 105, according to an example implementation of the present subject matter.

At block 605, a digital image of the print media may be obtained. In an example, the digital image, such as a scanned image, may be generated by the image capturing device, such as a scanner or a camera. Additionally, in cases where both the surfaces of the print media include content, a digital image of each of the surfaces may be generated. The digital image may be obtained by the image processing engine 225.

At block 610, the digital image may be divided into a plurality of cells to generate a processed image. In an example, the image processing engine 225 may divide the digital image into the multiple cells 305, based on a dimension or granularity of the separating tool 260. Alternatively, the cells may be divided based on a default logic defining the dimensions of the cell. In an example, where both the surfaces of the print media are to be processed, the digital image of a surface may be combined with a mirror image of the other surface to generate a combined processed image including multiple cells.

At block 615, digital data corresponding to the processed image may be analyzed to detect marked cells. In an example, the content analysis engine 120 may analyze the digital data 245, which includes a series of raster data to detect pixels that may overlay a marked portion. For instance, using the raster data, the pixels corresponding to those areas of the print media 105, which may include content if the processing image is printed, may be identified.

At block 620, for each cell, it may be ascertained whether a cell overlays a marked portion within the processed image. In an example, to ascertain whether the cell overlays the marked portion, the content analysis engine 120 may map the detected pixels to the cells 305 to detect the marked cells. In case it is ascertained that the cell does not overlay the marked portion ('NO' branch from block 620), the cell may be tagged as an unmarked cell in the processed image. The unmarked cell represents a virtual area of the digital image or processed image that overlays an unmarked portion, i.e., is free from any content. However, if at block 620 it is ascertained that the cell overlays a marked portion ('YES' branch from block 620) the cell is tagged as a marked cell in the processed image.

At block 635, the marked portion(s) of the print media corresponding to the marked portion of the processed image are determined. The marked portions of the print media are determined, based on the marked cells. In an example, the media separating unit 125 may determine the marked portion(s) of the print media corresponding to the marked portion of the processed image. Further, the media separating unit 125 while processing the print media 105, for each marked cell determines a corresponding area of the print media 105.

At block 640, the determined marked portions are separated from the print media to provide the processed media including the unmarked portions and free from the marked portions. In an example, the separating tool 260 of the media separating unit 125 may separate the determined marked portions. The separating tool 260 may implement, for instance, a laser source or a mechanical cutting source to separate out the marked portions 110.

Thus, the present subject matter provides an efficient way of recycling without using harmful chemicals that may be used for de-inking. Further, in institutions, majority of the print media is generally unmarked, the processed media may be easily recovered with minimum or no wastage.

Figure 7:
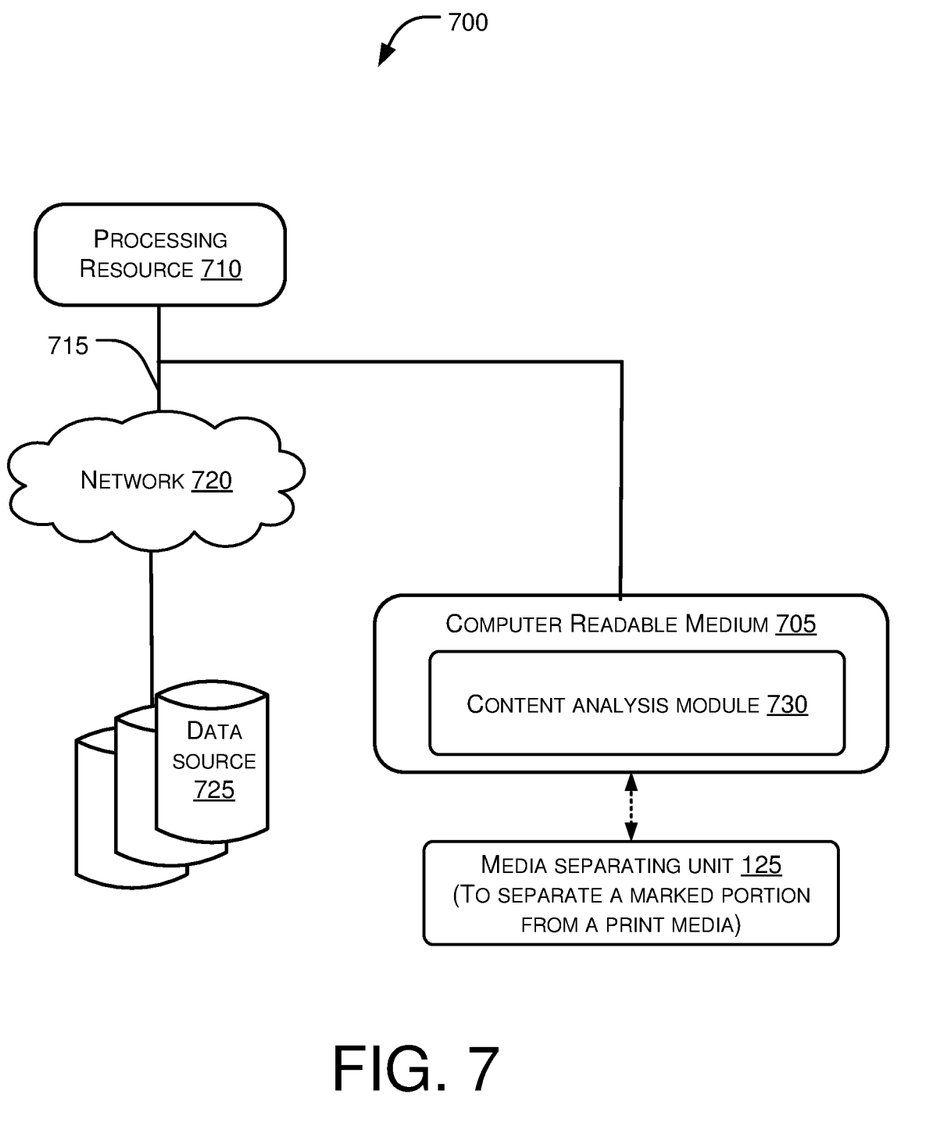
FIG. 7 illustrates a network environment to process print media, according to an example implementation of the present subject matter.

FIG. 7 illustrates an example network environment 700 using a non-transitory computer readable medium 705 for replicating memory volumes, according to an example implementation of the present subject matter. The network environment 700 may be a public networking environment or a private networking environment. In one example, the network environment 700 includes a processing resource 710 communicatively coupled to the non-transitory computer readable medium 705 through a communication link 715.

For example, the processing resource 710 can be a processor of a computing system, such as the system 100. The non-transitory computer readable medium 705 can be, for example, an internal memory device or an external memory device. In one example, the communication link 715 may be a direct communication link, such as one formed through a memory read/write interface. In another example, the communication link 715 may be an indirect communication link, such as one formed through a network interface. In such a case, the processing resource 710 can access the non-transitory computer readable medium 705 through a network 720. The network 720 may be a single network or a combination of multiple networks and may use a variety of communication protocols.

The processing resource 710 and the non-transitory computer readable medium 705 may also be communicatively coupled to data sources 725 over the network 720. The data sources 725 can include, for example, databases and computing devices. The data sources 725 may be used by the database administrators and other users to communicate with the processing resource 710.

In one example, the non-transitory computer readable medium 705 includes a set of computer readable instructions such as a content analysis module 730. As would be understood, the content analysis module 730 implements the functionality of the content analysis engine 120. The set of computer readable instructions, referred to as instructions hereinafter, can be accessed by the processing resource 710 through the communication link 715 and subsequently executed to perform acts for network service insertion.

For discussion purposes, the execution of the instructions by the processing resource 710 has been described with reference to various components introduced earlier with reference to the description of FIGS. 1-4.

On execution by the processing resource 710, the content analysis module 730 may obtain digital image of the print media 105. In an example, the content analysis module 730 may obtain a first digital image corresponding to a first surface of the print media 105 and a second digital image corresponding to a second surface of the print media 105. Further, a combined processed image, such as the combined processed image 430, based on the first digital image and a mirror image of the second image may be generated. The combined processed image includes a plurality of cells extending throughout the combined processed image. Each of the first digital image and the second digital image into may have been divided into the cells 305, based on a dimension of a separating tool of the media separating unit 125. Alternatively, the digital images may first be combined and then divided in to the cells 305.

The content analysis module 730 may further detect at least one marked cell from the plurality of cells, wherein the at least one marked cell overlays the marked portion of the combined processed image. For example, the content analysis module 730 may generate digital data corresponding to the combined processed image. The digital data includes a series of raster data. Further, for each pixel in the combined processed image, it may be determined whether the pixel would include content if the combined processed image is printed, based on raster data corresponding to the pixel. Finally, the pixels may be mapped to the cells 305 to detect at least one marked cell.

Upon detection, the content analysis module 730 may generate control instructions to activate and control a media separating unit, such as the media separating unit 125. The media separating unit 125 determines the marked portion 110 of the print media 105 to be separated corresponding to the marked portion within the combined processed image. The determined marked portion may then be separated from the print media 105 to provide the processed media 130 including the unmarked portions 115.

Although examples for processing print media have been described in language specific to structural features and/or methods, it is to be understood that the appended claims are not limited to the specific features or methods described. Rather, the specific features and methods are disclosed as examples for processing the print media.

What is claimed is:

1. A system to process print media, the system comprising:
    a content analysis engine to detect at least one marked cell from a plurality of cells extending throughout a processed image of the print media, with the processed image of the print media having marked portions and unmarked portions, wherein the marked portions include print on an area of the print media, and the at least one marked cell overlays a marked portion of the processed image; and
    a media separating unit coupled to the content analysis engine to,
        determine location of marked portions of the print media corresponding to the marked portions of the processed image; and
        separate the determined location of the marked portions of the print media, including the print on the area, from a remaining portion of the print media to provide a processed media including the unmarked portions.

2. The system as claimed in claim 1, wherein the system further comprises an image processing engine to generate a digital image of the print media, the digital image being processed to provide the processed image.

3. The system as claimed in claim 1, wherein the system further comprises an image processing engine to divide a digital image of the print media into the plurality of cells to provide the processed media, and wherein the digital image is divided based on a dimension of a separating tool of the media separating unit.

4. The system as claimed in claim 1, wherein the content analysis engine is to further:
   analyze digital data corresponding to the processed image to ascertain whether a cell overlays the marked portion, the digital data including a series of raster data; and
   tag the cell as a marked cell, when the cell overlays the marked portion.

5. The system as claimed in claim 4, wherein the content analysis system to analyze the digital data is to further:
   generate the digital data corresponding to the processed image;
   determine, for each pixel in the processed image, whether it would include content if a digital image corresponding to the processed image is printed, based on raster data corresponding to the pixel; and
   map the pixels to the plurality of cells.

6. The system as claimed in claim 1, wherein the media separating unit comprises one of a mechanical cutting tool and a laser cutting tool.

7. A method for processing print media, the method comprising:
   receiving a processed image corresponding to a digital image of the print media, the print media having at least one marked portion and at least one unmarked portion, wherein the at least one marked portion includes print on an area of the print media, and the processed image includes a plurality of cells extending throughout the digital image;
   analyzing the processed image to detect at least one marked cell overlaying the at least one marked portion within the processed image; and
   operating a media separating unit, based on the analyzing of the processed image, to separate the at least one marked portion, including the print on the area, from a remaining portion of the print media, and corresponding to the at least one marked cell from the print media to provide processed media including the at least one unmarked portion.

8. The method as claimed in claim 7, wherein the method further comprises dividing the digital image into the plurality of cells based on a dimension of a separating tool of the media separating unit to generate the processed image.

9. The method as claimed in claim 7, wherein analyzing further comprises:
   generating digital data corresponding to the processed image, the digital data including a series of raster data;
   determining, for each pixel in the processed image, whether it would include content if the digital image is printed, based on raster data corresponding to the pixel; and
   mapping the pixels to the plurality of cells to detect the at least one marked cell.

10. The method as claimed in claim 7, wherein the method further comprises determining at least one marked portion of the print media to be separated corresponding to the at least one marked portion within the digital image.

11. The method as claimed in claim 7, wherein the separating comprises one of mechanically cutting and laser cutting.

12. A non-transitory computer readable medium having a set of computer readable instructions that, when executed, cause a processor to:
   obtain a first digital image corresponding to a first surface of a print media and a second digital image corresponding to a second surface of the print media, each surface of the print media having a marked portion and an unmarked portion, wherein the marked portion includes print on an area of the print media;
   generate a combined processed image based on the first digital image and a mirror image of the second image, the combined processed image including a plurality of cells extending throughout the combined processed image;
   detect at least one marked cell from the plurality of cells, wherein the at least one marked cell overlays the marked portion of the combined processed image; and
   further generate control instructions to activate a media separating unit to separate the marked portion, including the print on the area, corresponding to the at least one marked cell from a remaining portion of the print media to provide processed media including unmarked portions.

13. The non-transitory computer readable medium as claimed in claim 12, wherein the computer readable instructions, when executed, further cause the processor to divide each of the first digital image and the second digital image into the plurality of cells, based on a dimension of a separating tool of the media separating unit.

14. The non-transitory computer readable medium as claimed in claim 12, wherein the computer readable instructions, when executed, further cause the processor to:
   generate digital data corresponding to the combined processed image, the digital data including a series of raster data;
   determine, for each pixel in the combined processed image, whether it would include content if the digital image is printed, based on raster data corresponding to the pixel; and
   map the pixels to the plurality of cells to detect the at least one marked cell.

15. The non-transitory computer readable medium as claimed in claim 12, wherein the computer readable instructions, when executed, further cause the processor to, determine at least one marked portion of the print media to be separated corresponding to the at least one marked portion within the combined processed image.

* * * * *